(12) United States Patent
Schaffstall et al.

(10) Patent No.: US 11,781,593 B2
(45) Date of Patent: Oct. 10, 2023

(54) ELECTROSTATIC DISSIPATIVE EXTERNALLY PRESSURIZED POROUS BEARINGS

(71) Applicant: New Way Machine Components, Inc., Aston, PA (US)

(72) Inventors: Joshua A. Schaffstall, Aston, PA (US); Dakota H. Peirce, Cinnaminson, NJ (US); Michael T. Sabol, Newtown Square, PA (US); Andrew Devitt, Media, PA (US); Richard D. Pollick, West Chester, PA (US)

(73) Assignee: NEW WAY MACHINE COMPONENTS, INC., Aston, PA (US)

(*) Notice: Subject to any disclaimer, the term of this patent is extended or adjusted under 35 U.S.C. 154(b) by 0 days.

(21) Appl. No.: 17/894,520

(22) Filed: Aug. 24, 2022

(65) Prior Publication Data

US 2023/0069184 A1    Mar. 2, 2023

Related U.S. Application Data

(60) Provisional application No. 63/236,461, filed on Aug. 24, 2021.

(51) Int. Cl.
*F16C 32/06* (2006.01)
*F16C 33/16* (2006.01)
*F16C 29/02* (2006.01)
*F16C 33/74* (2006.01)

(52) U.S. Cl.
CPC ........ *F16C 32/0618* (2013.01); *F16C 29/025* (2013.01); *F16C 33/16* (2013.01); *F16C 33/748* (2013.01); *F16C 2206/56* (2013.01)

(58) Field of Classification Search
CPC .... F16C 29/025; F16C 32/0618; F16C 33/16; F16C 33/748; F16C 2206/56
See application file for complete search history.

(56) References Cited

U.S. PATENT DOCUMENTS

| | | | |
|---|---|---|---|
| 7,604,439 B2 * | 10/2009 | Yassour | H01L 21/6838 414/676 |
| 9,400,010 B2 * | 7/2016 | Chen | F16C 32/0614 |
| 10,598,222 B2 * | 3/2020 | Devitt | F16J 15/342 |
| 2015/0288302 A1 | 10/2015 | Tatsumi et al. | |
| 2016/0068360 A1 | 3/2016 | Devitt et al. | |
| 2019/0088507 A1 | 3/2019 | Suzuki et al. | |

FOREIGN PATENT DOCUMENTS

| | | | | |
|---|---|---|---|---|
| CN | 106629054 A | | 5/2017 | |
| JP | H10169654 A | * | 6/1998 | |
| JP | H1162965 A | * | 3/1999 | |
| JP | 2010019425 A | * | 1/2010 | ............ F16C 17/24 |
| WO | 2018-067707 A1 | | 4/2018 | |

* cited by examiner

*Primary Examiner* — Phillip A Johnson
(74) *Attorney, Agent, or Firm* — Volpe Koenig

(57) ABSTRACT

A non-contact air bearing having electrostatic discharge properties may comprise: a porous media element having a bearing surface; a supply line configured supply an externally pressurize gas or fluid to the porous media; and an electrostatic dissipative porous bearing layer on the bearing surface of the porous media element; wherein the externally pressurized fluid flows through the porous media element and creates a thin film between the electrostatic dissipative layer and a substrate supported by the air bearing.

8 Claims, 5 Drawing Sheets

ELECTROSTATIC DISSIPATIVE EXTERNALLY PRESSURIZED POROUS BEARINGS

REFERENCE TO RELATED APPLICATIONS

This application claims the benefit of U.S. Provisional Application No. 63/236,461, filed Aug. 24, 2021, which is incorporated by reference as if fully set forth.

BACKGROUND

Current style air conveyors or air turns, namely current art porous media aerostatic air bars or air turns, do not include features or properties to prevent electrostatic discharge. Prior art solutions to prevent electrostatic discharge, in general, have included a variety of techniques, grounding methods, limiting the use of materials which are on the opposite sides of the triboelectric series of materials, and also using certain materials which have dissipative properties. In order for air bearings to function properly and to also have ESD safe features which will prevent electrostatic discharge, it is imperative to develop a solution which allows both the required gas flow rate (as required by various applications) and the required surface resistivity of the porous material, simultaneously. Accordingly, there is a need for an air bearing which includes electrostatic dissipative materials that have the necessary surface resistivity properties along with application-specific flow requirements.

SUMMARY

A non-contact air bearing having electrostatic discharge properties may comprise: a porous media element having a bearing surface; a supply line configured supply an externally pressurize gas or fluid to the porous media; and an electrostatic dissipative porous bearing layer on the bearing surface of the porous media element; wherein the externally pressurized fluid flows through the porous media element and creates a thin film between the electrostatic-dissipative layer and a substrate supported by the air bearing. The porous media element may be a porous graphite material. The electrostatic dissipative porous bearing layer may be a silicon carbide material. The silicon carbide material may further comprise sealant properties. The silicon carbide material may not seal the porosity of the porous media element. The non-contact air bearing may be an air bar. The non-contact air bearing may be an air turn. The non-contact air bearing may be configured for use as a seal.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
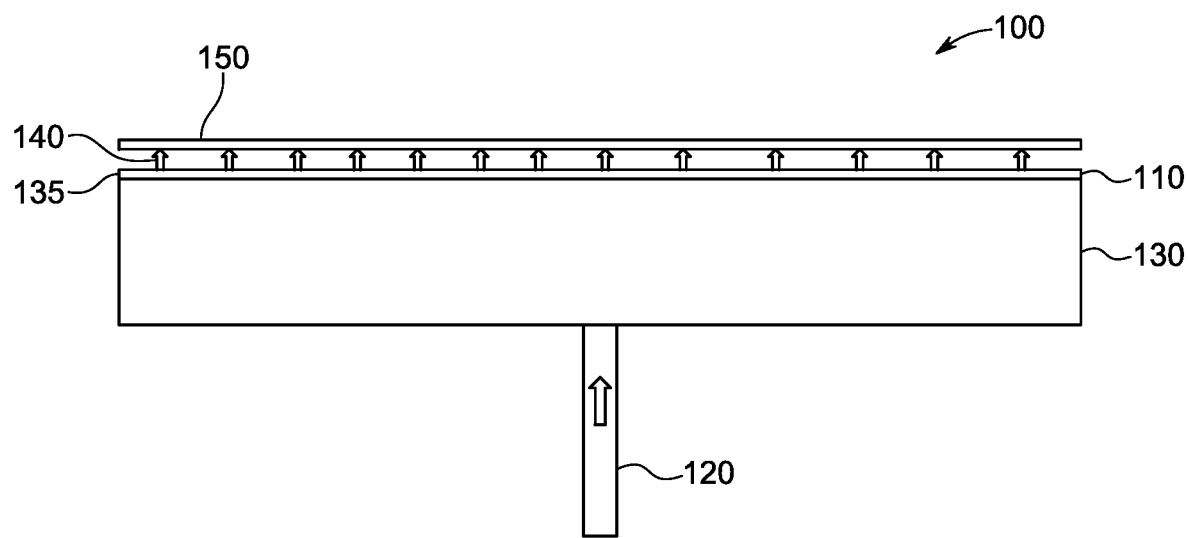
FIG. 1 is example of a porous media air bearing with a electrostatic dissipative porous bearing layer.

Certain terminology is used in the following description for convenience only and is not limiting. The words "front," "back," "left," "right," "inner," "outer," "upper," "lower," "top," and "bottom" designate directions in the drawings to which reference is made. Additionally, the terms "a" and "one" are defined as including one or more of the referenced item unless specifically noted otherwise. A reference to a list of items that are cited as "at least one of a, b, or c" (where a, b, and c represent the items being listed) means any single one of the items a, b, or c, or combinations thereof. The terminology includes the words specifically noted above, derivatives thereof, and words of similar import.

The following provides the details for an externally-pressurized porous media bearing with electrostatic dissipative (ESD) properties or features, which can be used for, but not limited to, bearings, air conveyors, seals, and other applications in a variety of industries, including, but not limited to, frictionless conveyance of glass and thin substrates, printed circuit boards, and semiconductor equipment. For the balance of this specification, and for the convenience of describing limited specific applications, the area of focus will be that of porous aerostatic "air (conveyor) bars" which may convey flat glass in a non-contact fashion for the Flat Panel Display (FPD) market, and also porous aerostatic "air turns" which may convey thin film materials (in a non-contact, non-rotating fashion) in applications which may traditionally use contact rollers, which rotate for such conveyance. The present application is not limited to these two product or application areas, and may be deployed in any other application where porous media air bearing or seals are used.

FIG. 1 is example of a porous media air bearing 100 with an electrostatic dissipative porous bearing layer 110. The porous media air bearing 100 includes a supply line for providing an externally pressurized gas or fluid to the porous media element 130. The porous media element 130 has a bearing surface 135 that includes the electrostatic dissipative layer 110. The externally pressurized fluid flows through the porous media element 130 and creates a thin film 140 between the electrostatic dissipative layer 110 and a substrate.

In one embodiment, the electrostatic dissipative layer 110 is a layer of permeable silicon carbide silicon carbide sealant that is sprayed on in a manner that bonds to the bearing surface of the porous media air bearing, but avoids sealing the porosity of the porous media element 130. The porous media element 130 may comprise graphite or carbon. Alternatively, the porous media element may also be comprised of any porous material such as sintered metal, alumina, or any conductive or insulative porous material.

In an example, the porous media air bearing 100 may be a conveyor, air bar, or air turn. In another example, the substrate 150 may be a piece of flat glass such as a glass panel for a flat panel display.

Figure 2:
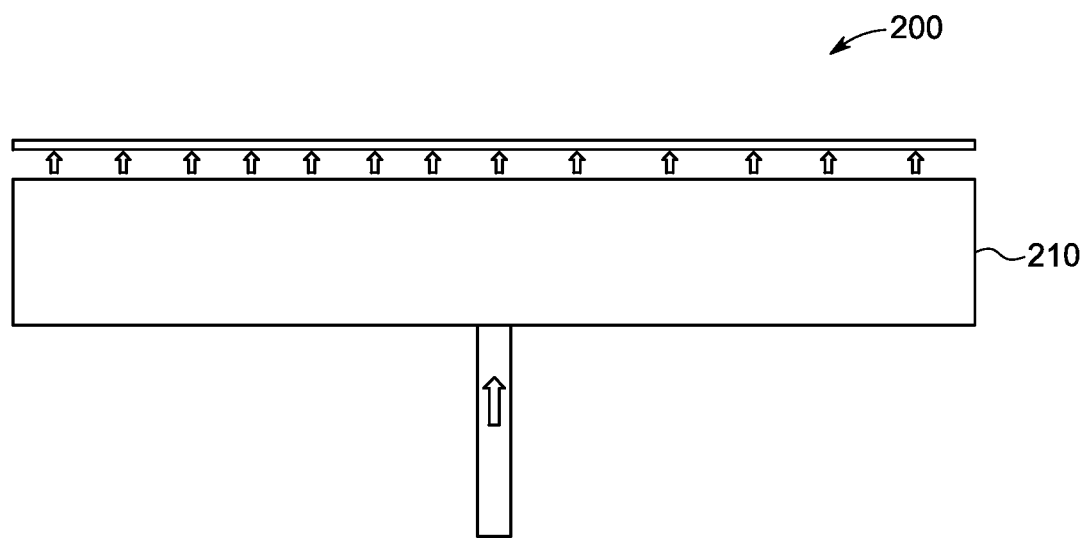
FIG. 2 is an example of a porous media air bearing with an electrostatic dissipative porous media element.

FIG. 2 is example of a porous media air bearing 200 with an electrostatic dissipative porous media element 210. As an example, the porous media element 210 may comprise a electrostatic dissipative material, such as Polytetrafluoroethylene (PTFE).

Figure 3:
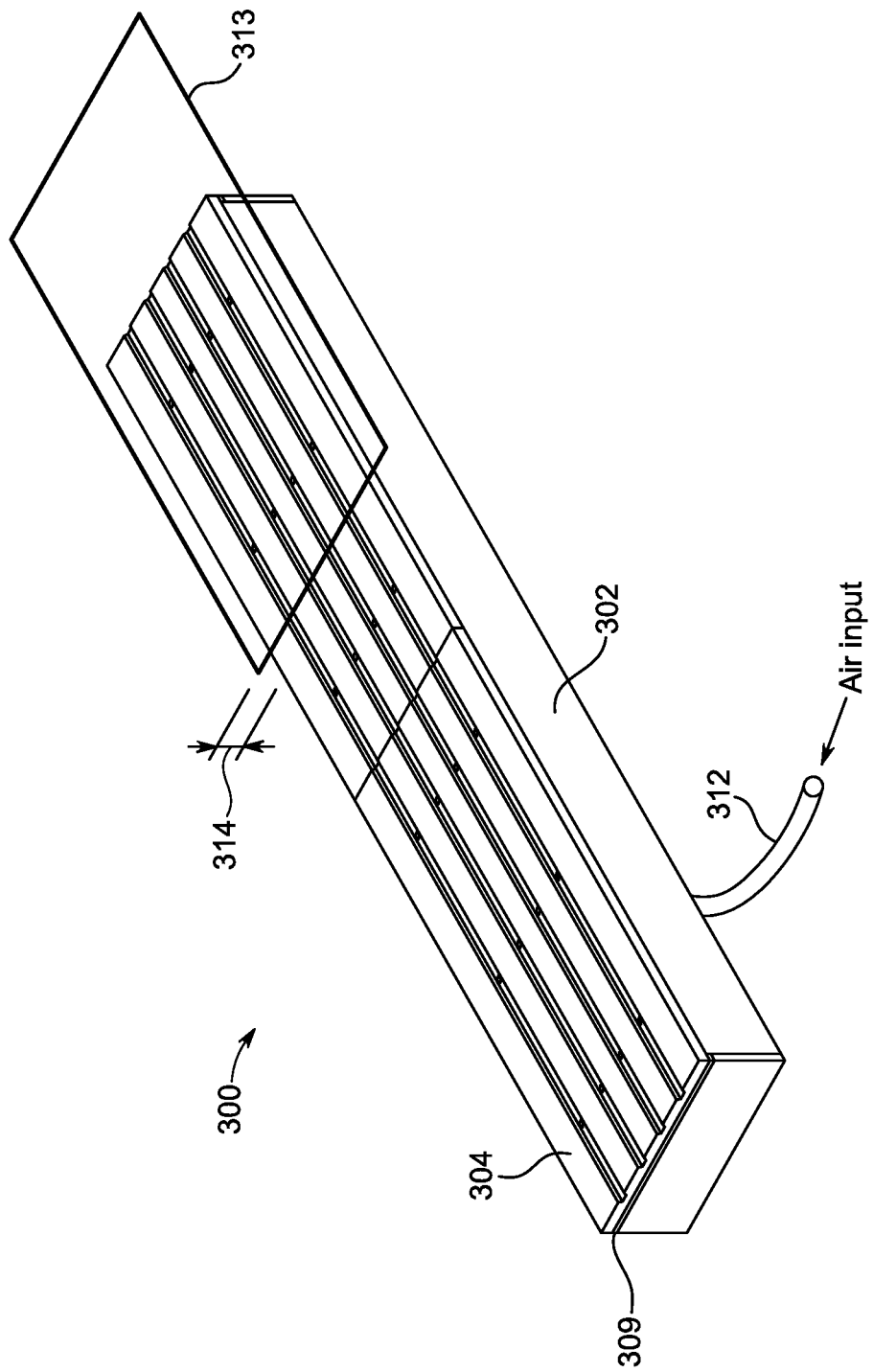
FIG. 3 is an example air bar or air bearing that uses a porous PTFE or other electrostatic-dissipative material as the porous media element.

FIG. 3 is an example air bar 300 or air bearing that uses a porous PTFE, or other electrostatic-dissipative material as the porous media element 304. The porous media element 304 is assembled to the housing 302 as shown, and may be affixed to the housing 302 via epoxy 309. Pressurized air is injected into tubing 312, and the tubing 12 is inserted into a fitting (not shown). Pressurized air flows into the housing 302, and out through the surface of the porous media element 304. A material to be conveyed 313, for example a thin glass material, may "float" atop the porous media element 304 and establish an air gap (or fly height) 314. The sliding motion of the material to be conveyed 313 across the porous media element 304 can create static charge or stray currents which, for certain applications, may be mitigated as described by using an electrostatic dissipative material such as porous PTFE 304 (or other material as described herein) in lieu of current art porous media.

Figure 4:
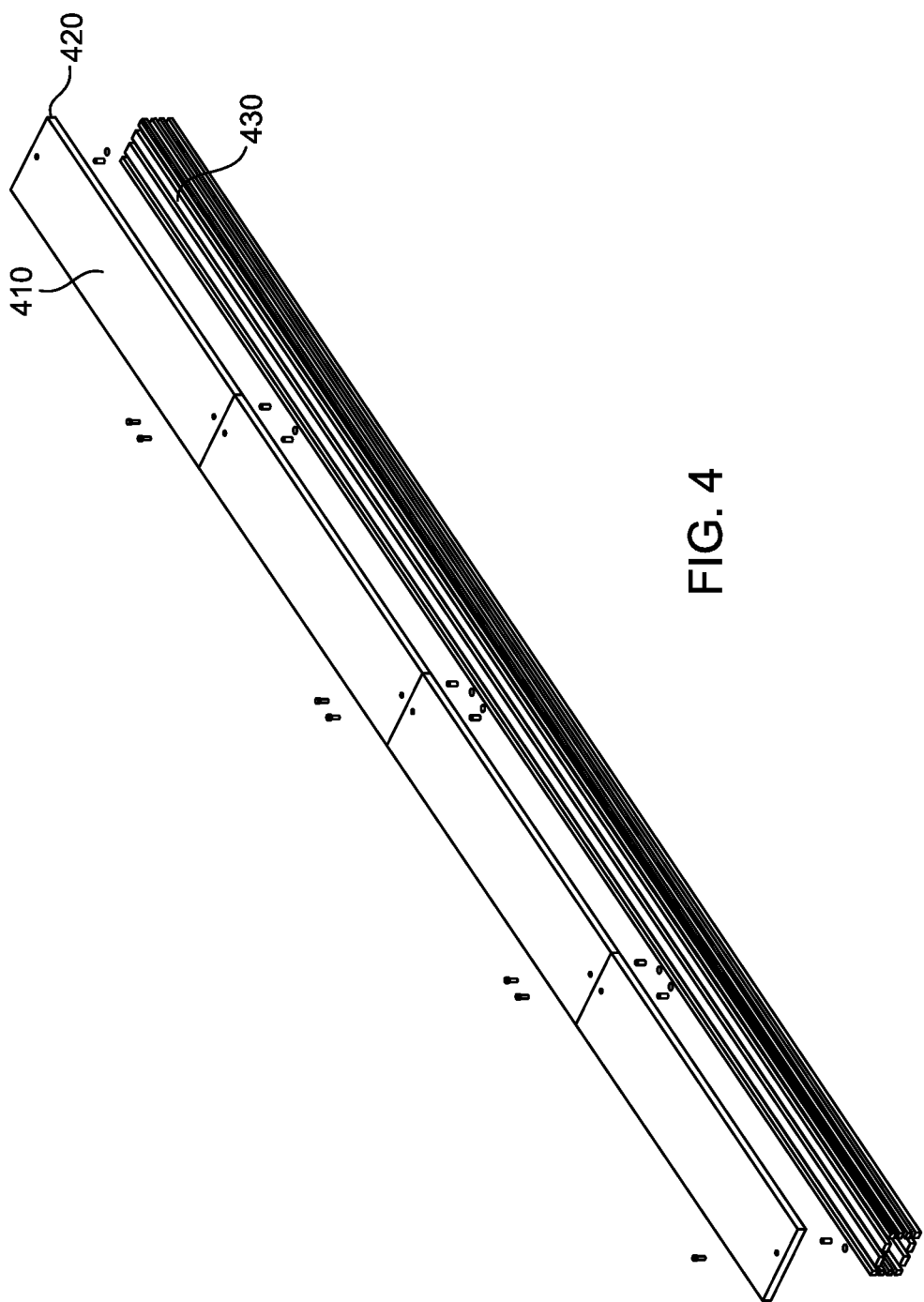
FIG. 4 is an example air bar with an electrostatic dissipative porous media bearing surface applied to the top of a porous media element.

FIG. 4 shows an example air bar 400 that includes an electrostatic dissipative porous bearing layer 410 applied to the top of the porous media element 420. The porous media element 420 may be mounted to a housing 430 using screws or fasteners for example. Externally pressurized fluid flows through the porous media element 420 and creates a thin film between the electrostatic dissipative layer 410 and a substrate (not shown) to be conveyed across the air bar 400.

Figure 5:
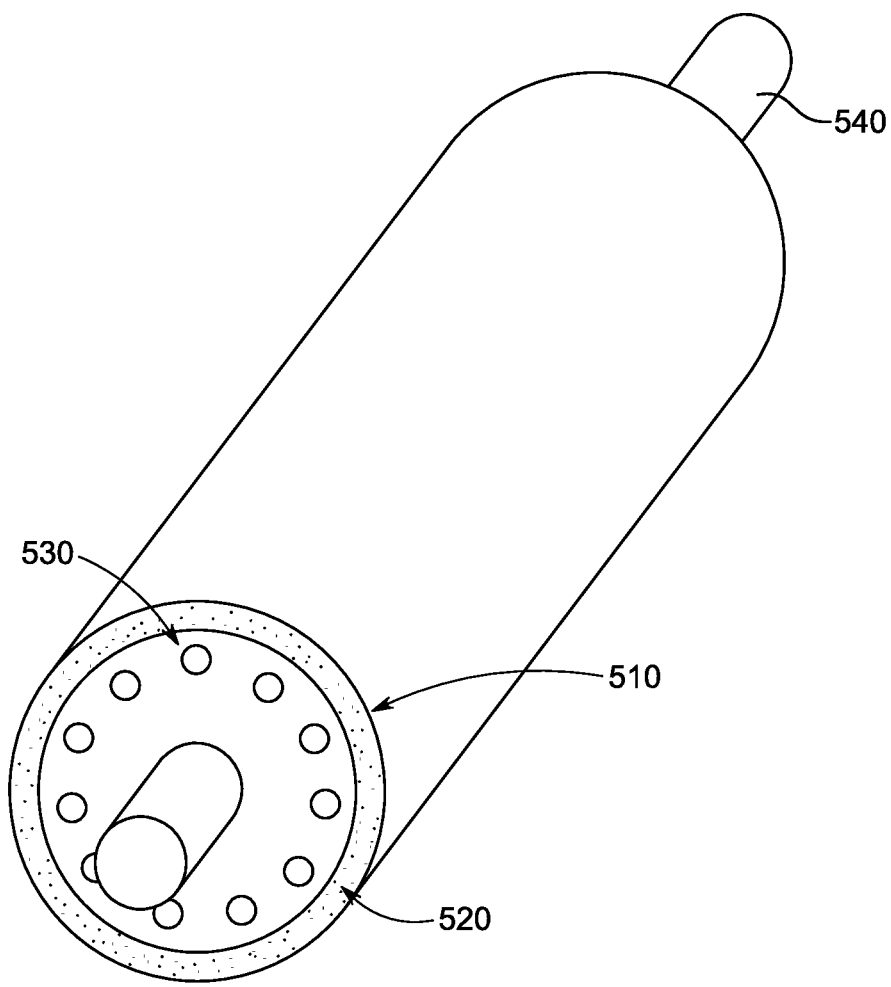
FIG. 5 illustrates an assembly drawing for an externally-pressurized porous media air turn with an electrostatic dissipative layer.

FIG. 5 shows an assembly drawing for an externally-pressurized porous media air turn 500 with an electrostatic dissipative layer 510. The electrostatic dissipative layer may be, for example, a silicon carbide coating applied to the bearing surface of the porous media sleeve 520. The porous media sleeve 520 may be assembled to a solid or hollow rotatable shaft 540 manufactured out of metal or some other suitable material. The shaft may include ends that contain axial holes 530 which are connected to grooves contained in the shaft 540 or machined into the inside diameter of the porous media sleeve 520. The porous media sleeve 520 may be installed to the outside of the shaft 540. The holes 530 may be on one or both sides of the shaft, or on one or both sides of the porous media sleeve 520. The outer porous media sleeve may be one continuous member or may be attached to the shaft in segments, so long as the segments are sealed together to prevent escapement of gas. Pressurized fluid or gas may flow into the holes 530 and through the porous media sleeve 520 to create a thin film between the porous media sleeve and a web (not shown).

Figure 6:
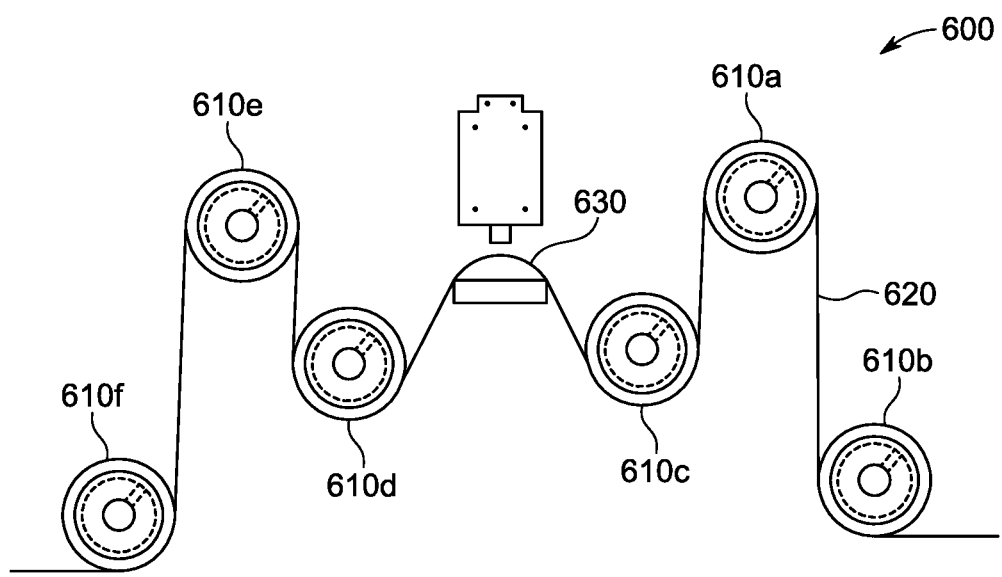
FIG. 6 illustrates an example system of externally-pressurized porous media air turns.

FIG. 6 shows an example system 600 of externally-pressurized porous media air turns 610a-610f, that each include an electrostatic dissipative layer similar to the air turn shown in FIG. 5. The air turns 610a-610f convey and tension a web through a processing chamber 630. The electrostatic dissipative layer on each air turn may prevent a buildup of static electricity.

In each of the preceding embodiments, the electrostatic dissipative layer prevents or reduces electrostatic discharge while, at the same time, providing the proper porous nature to act as an externally-pressurized air bearing, air seal, air conveyor, or air turn (but not limited to these products). The electrostatic dissipative layer or material which possesses a proper amount of porosity (permeability) and a correct amount of surface resistivity. Electrostatic dissipative layer or material reduces the build-up of electrostatic energy. The industry-accepted range for dissipative protection ranges from either $10^4$ to $10^{12}$ ohms/sq or $10^5$ to $10^{12}$ ohms/sq (ref. MIL-HDBK-263 or JADEC Standard JESD625B).

One such porous material that has been used in line with specific porosity/permeability (flow) and ESD requirements involves a porous form of PTFE (although this patent application is not limited to porous PTFE, other porous materials, such as but not limited to certain types of silicon carbide, porous ceramics, porous plastics, with the proper mix of air (or other gases) flow and surface resistivity are also applicable). It is noted that, when using PTFE, one possible manufacturing process includes isostatic molding (using a mixture of various additives which may customize the amount of resistivity of the final PTFE state) and sintering. The use of PTFE for the subject novel invention is not limited to this specific process or dissipative material.

It should be noted that various air bearing applications may require different values of air (or other gases) flow, which is typically measured on a standard cubic feet per hour (SCFH) per square inch (in^2) basis, or SCFH/in^2.

While preferred embodiments have been set forth in detail with reference to the drawings, those skilled in the art who have reviewed the present disclosure will readily appreciate that other embodiments can be realized within the scope of the invention, which should therefore be construed as limited only by the appended claims

What is claimed is:

1. A non-contact air bearing having electrostatic discharge properties comprising:
    a porous media element having a bearing surface;
    a supply line configured supply an externally pressurize gas or fluid to the porous media; and
    an electrostatic-dissipative porous bearing layer on the bearing surface of the porous media element;
    wherein the externally pressurized fluid flows through the porous media element and creates a thin film between the electrostatic dissipative layer and a substrate supported by the air bearing.

2. The non-contact air bearing of claim 1, wherein the porous media element is a porous graphite material.

3. The non-contact air bearing of claim 1, wherein the electrostatic dissipative porous bearing layer is a silicon carbide material.

4. The non-contact air bearing of claim 3, wherein the silicon carbide material further comprise sealant properties.

5. The non-contact air bearing of claim 4, wherein the silicon carbide material does not seal the porosity of the porous media element.

6. The non-contact air bearing of claim 1, wherein the non-contact air bearing is an air bar.

7. The non-contact air bearing of claim 1, wherein the non-contact air bearing is an air turn.

8. The non-contact air bearing of claim 1, wherein the non-contact air bearing is configured for use as a seal.

* * * * *